United States Patent [19]

Bostrom et al.

[11] Patent Number: 5,314,233
[45] Date of Patent: May 24, 1994

[54] SEAT CONSTRUCTION HAVING A MECHANISM FOR STORING A TANK

[76] Inventors: John M. Bostrom, 6609 Riverside Rd., Waterford, Wis. 53185; Kurt H. Bostrom, W296 N2241 Glen Glove Rd., Pewaukee, Wis. 53072

[21] Appl. No.: 885,506

[22] Filed: May 19, 1992

Related U.S. Application Data

[63] Continuation-in-part of Ser. No. 724,598, Jul. 2, 1991, Pat. No. 5,213,392.

[51] Int. Cl.$^5$ ............................................. A47C 7/62
[52] U.S. Cl. .................................. 297/217; 297/191
[58] Field of Search .............. 297/191, 217, 460, 188

[56] References Cited

U.S. PATENT DOCUMENTS 3,971,591 7/1976 Ziaylek .............................. 297/191
4,793,652 12/1988 Hannah et al. ..................... 297/230

OTHER PUBLICATIONS

Ziamatic Corp. "Zico Breathing Apparatus Holders and Accessories".
Seats Incorporated, "Introducing The New SCBA 911 Fire Apparatus Seat".

Primary Examiner—Peter R. Brown
Attorney, Agent, or Firm—Andrus, Sceales, Starke & Sawall

[57] ABSTRACT

A seat construction having a provision for storing a tank for a self-contained breathing apparatus. The seat includes an elongated cavity adapted to receive the tank and the rear of the cavity is enclosed by a seat back that includes a rear surface and a pair of side surfaces which extends forwardly from the rear surface. A pair of brackets are positioned in horizontally spaced relation and one end of each bracket is connected to the rear surface, while the opposite end of the bracket is connected to the respective side surface. The brackets carry generally flat supporting surfaces which are disposed to support the tank. A belt extends through slots in the brackets and the free ends of the belts are fastened together to secure the tank against the supporting surfaces.

9 Claims, 3 Drawing Sheets

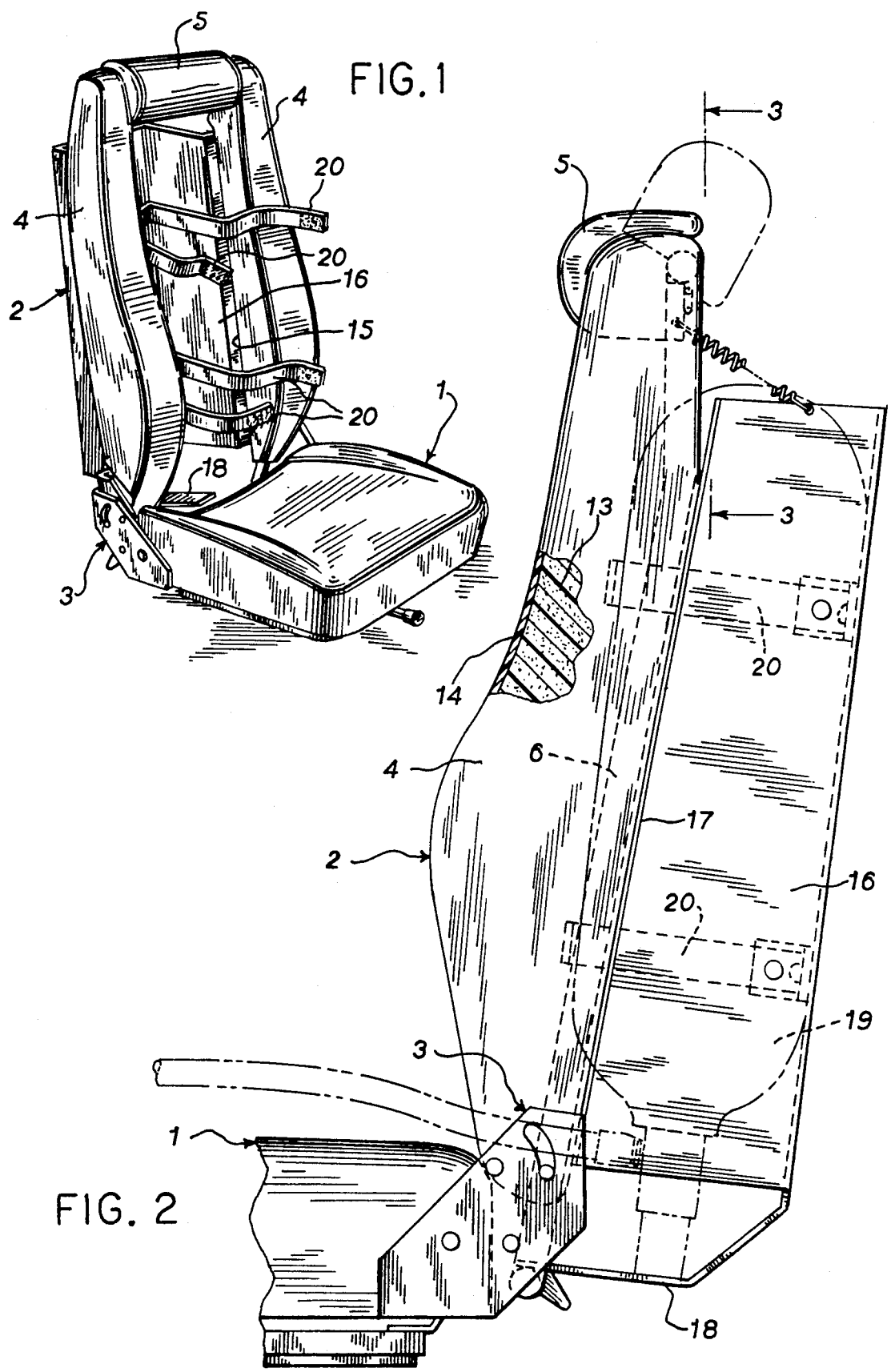

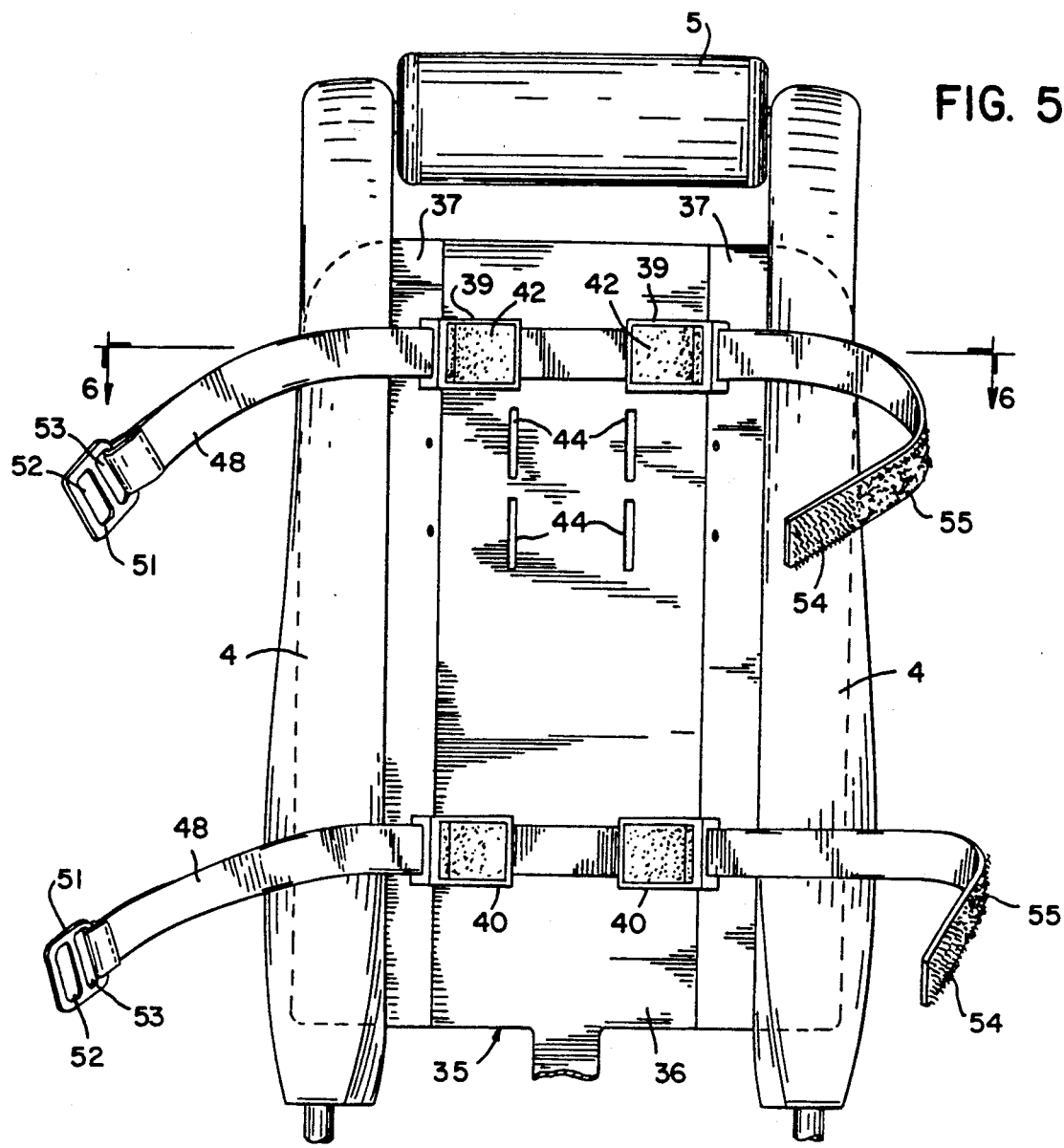
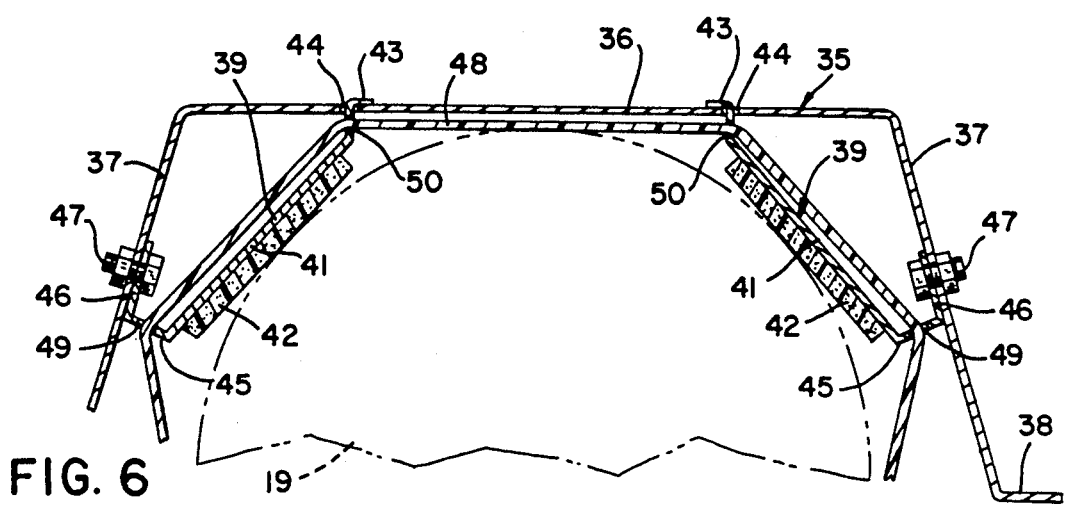
FIG. 5
FIG. 6

SEAT CONSTRUCTION HAVING A MECHANISM FOR STORING A TANK

This application is a continuation-in-part of application Ser. No. 07/724,598, filed Jul. 2, 1991 and entitled Seat Construction and issued as U.S. Pat. No. 5,213,392 on May 25, 1993.

BACKGROUND OF THE INVENTION

Fire fighters are provided with self-contained breathing apparatus (SCBA), which includes an air cylinder that is strapped to the fire fighter's back when the fire fighter enters a burning or hazardous area. The SCBA is normally stored in the fire truck and, in some cases, the truck is provided with a post, column, or bracket and several SCBA are clamped to the post. With this arrangement, the fire fighter at the scene of the fire, must then unclamp the cylinder, remove the SCBA from this mounting device and then strap the SCBA to his body. This procedure can require a number of seconds which can be critical when dealing with the fire. In other cases, the backs of the seats in the fire truck are manufactured formed with elongated central cavities and the air cylinders of the SCBA are clamped, or otherwise secured in the cavities for storage.

The recent trend has been for the fire fighter to strap the SCBA to his body while the fire fighter is seated on the seat in the fire truck, with the SCBA stored in the cavity in the seat back. With this arrangement, precious seconds can be saved, due to the fact that the fire fighter does not have to remove the SCBA and strap the SCBA to his body at the scene of the fire.

Recently, the SCBA cylinders have been made from lightweight composite material and as a result of the weight reduction, the cylinders are constructed with a larger volume or size. Because of this, it has been found that when the fire fighter rises from the seat, with the SCBA strapped to his back, the top of the cylinder can catch on the head pad of the seat. By code or regulation, the seat must include a head pad to support the neck and head of the occupant, and the head pad must be located a specified distance above the seat base. Thus, the presence of the head pad can prevent the fire fighter from rising from the seat in the normal manner and the fire fighter must exert a conscious and somewhat awkward effort to move forwardly on the seat before rising.

In the past, the SCBA tank has typically been stored in the cavity in the seat by engaging the tank with a pair of C-shaped metal clips. The open end of each clip is bordered by a pair of flexible lips, and as the tank is pushed inwardly, the lips flex outwardly to enable the tank to be received within the clips. The lips then spring back to hold the tank in position.

The use of the metal C-shaped clips has certain disadvantages. For example, the clips are normally designed for a given tank diameter and thus will not accommodate tanks which have a significantly different diameter. Further, the metal clips cause wear to the tank as the tank is inserted and withdrawn from the clips, and as the clips are metal, vibrational noise results as the fire truck travels to an emergency site. As a further disadvantage, metal clips do not positively lock the tank to the seat and if the fire truck should stop suddenly the tank could fly forwardly from the clips and result in a potential danger to personnel in the truck.

SUMMARY OF THE INVENTION

The invention is directed to an improved seat construction that has particular application for use in a fire truck or other emergency vehicle. The seat includes a back which is composed of a pair of side pads spaced apart to provide a cavity or opening therebetween. The cavity is adapted to receive and store a SCBA, to be available immediately to be strapped to a fire fighter, or other seat occupant who is seated on the seat.

The rear of the cavity in the seat back is enclosed by a generally U-shaped closure and connecting the upper ends of the side pads is a head pad, which is mounted for pivoting movement from a head supporting position to a rear release position. As a fire fighter, having a SCBA strapped to the back, rises from the seat, the upper end of the cylinder will engage the undersurface of the head pad, pivoting the head pad to the release position to enable the cylinder to be removed from the cavity without catching or hanging up on the head pad.

The head pad is spring biased to the head supporting position, and after removal of the SCBA from the cavity, the head pad will be returned to its body supporting position under the influence of the biasing spring.

In situations where the SCBA is not strapped to the fire fighter, the cylinder can be stored in the cavity and secured to the rear enclosure by straps or clips.

With the seat construction of the invention, the head pad is automatically pivoted to a released or non-obstructing position by engagement with the cylinder as the fire fighter rises from the seat. After the fire fighter is unseated, the head pad will be automatically returned to its head supporting position.

The invention provides a simple and inexpensive construction for pivoting the head pad, in which the upper portion of the U-shaped frame for the seat back is utilized for a means for journalling the head pad for pivoting action.

The invention also includes a novel mechanism for storing a SCBA tank in the cavity or compartment of the seat. The mechanism includes one or more pairs of brackets with the brackets of each pair being attached in horizontally spaced relation to the seat back. Each bracket includes a generally flat supporting surface covered with a cushioning material, such as foam plastic, that is engaged by the tank.

To connect the brackets to the seat back, one end of each bracket is provided with a lip that is engaged with a slot in the rear surface of the seat back, while the opposite end of the bracket is secured by bolts to the side surface of the seat back.

A belt extends through slots in the brackets and the free ends of the belt are connected by a fastening mechanism, which can take the form of hook and loop connectors, to securely clamp the tank to the seat back.

With the tank retaining mechanism of the invention, the tank is securely held and centered within the cavity of the seat by engagement with the pads on the supporting surfaces of the brackets. As the pads are cushioned, damage and wear to the outer surface of the tank is prevented. The cushion pads also prevent vibrational noise as is encountered with the use of metal retaining clips.

As the supporting pads are generally flat and lie in diverging planes, the mechanism is capable of accommodating various sizes or diameters of tank without any change in construction.

As the belts surround the tank, the tank is positively locked to the seat and will not be dislodged from the seat in the event the fire truck is impacted.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of the seat construction of the invention;

FIG. 2 is a fragmentary side elevation of the seat;

FIG. 5 is a fragmentary front elevation of the seat construction showing a modified mechanism for clamping the SCBA tank the seat back; and FIG. 6 is a section taken along line 6—6 of FIG. 5.

DESCRIPTION OF THE ILLUSTRATED EMBODIMENT

Figure 3:
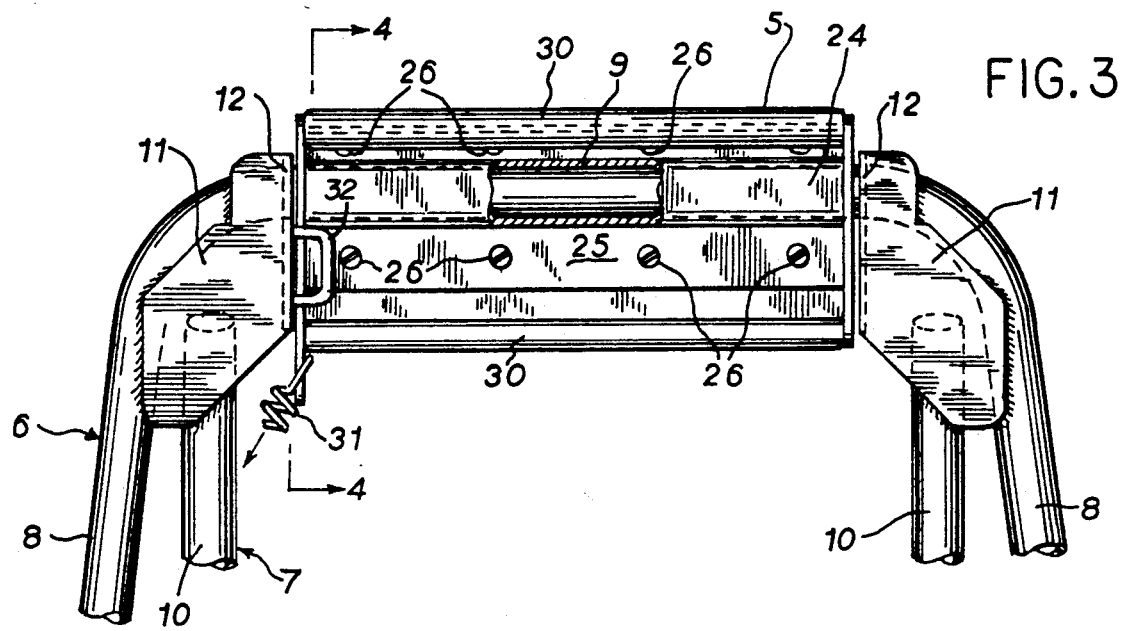
FIG. 3 is a fragmentary rear elevation of the back of the seat.

The drawings illustrate a seat which has particular application for use in a fire truck. The seat includes a base 1 and a back 2 extends upwardly from the rear of base 1. Back 2 can either be fixed to base 1, or can be mounted for tilting or pivoting movement relative to the base. As illustrated, the back is a tilting type and is connected to the base 1 via a conventional tilting mechanism indicated generally by 3. By manual release of the tilt mechanism, the back can be tilted in a fore-and-aft direction relative to base 1. The tilting mechanism is standard and in itself forms no part of the present invention.

Back 2 is composed of a pair of elongated side members or pads 4, the upper ends of which are connected by a head pad 5.

Back 2 includes an inverted U-shaped outer frame 6 and a U-shaped inner frame 7. Outer frame 6 is formed with a pair of generally vertical legs 8, the upper ends of which are connected by a horizontal section 9. Similarly, frame 7 includes a pair of vertical legs 10, which are located inwardly of legs 8, and the lower ends of legs 10 are connected together by a horizontal section, not shown. The upper ends of legs 10 are connected to the corresponding legs 8 by brackets 11, and each bracket 11 is provided with a flange 12 having an opening to receive the horizontal section 9 of outer frame 6.

Side pads 4 of back 2 also include a foam cushion 13, which is located outwardly of the frames 6 and 7, and a plastic or fabric covering 14 is secured around the cushion 13.

As best illustrated in FIG. 1, the space between side pads 4 defines an elongated cavity or opening 15, and the rear of the cavity is enclosed by a sheet metal closure 16, which is generally U-shaped in horizontal cross section. The side edges of closure 16 are provided with flanges 17, which are secured to the frames 6 and 7.

Both the top and bottom ends of the closure 16 are open and a lip 18 is connected to the lower end of the closure and extends inwardly below the open bottom end of the closure to provide a support for an air cylinder 19 of a self-contained breathing apparatus, SCBA, which is located within cavity 15.

In cases where the seat is unoccupied, cylinder 19 can be stored in cavity 15 and is retained in the cavity by straps 20, which are connected to the side edges of enclosure 16. Straps 20 can be provided with fasteners, preferably in the form of hook and loop fasteners as sold under the Velcro and other tradenames, which provide a convenient manner of connecting the straps in clamping relation around cylinder 19.

Figure 4:
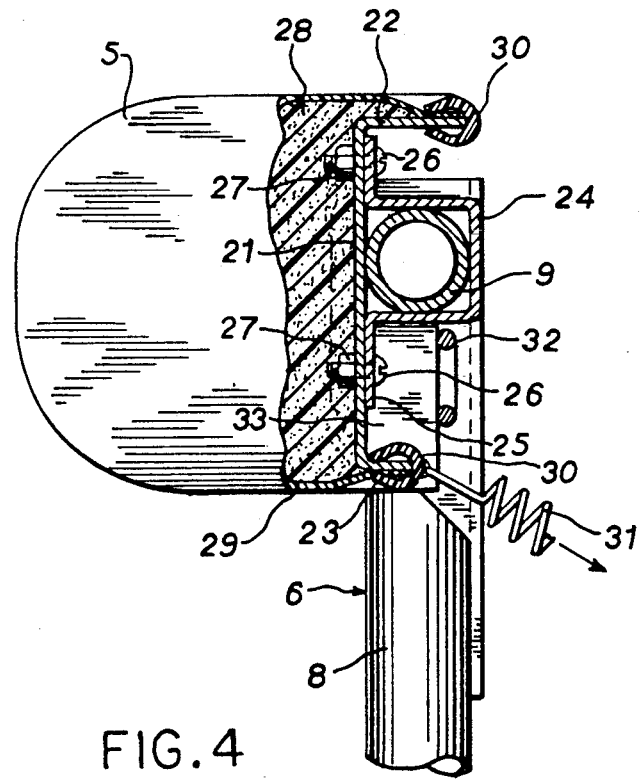
FIG. 4 is a section taken along line 4—4 of FIG. 3.

In other situations, where the SCBA 19 is strapped on the back of a fire fighter, the SCBA will be received in cavity 15 as the fire fighter sits on the base 1. To prevent the cylinder 19 from catching or hanging up on head pad 5, as the fire fighter rises from seat base 1, the head pad is mounted for pivoting movement from a head supporting position, as shown by the full lines in FIG. 2, to a release or non-obstructing position, shown by the dashed lines in FIG. 2. To provide this movement, head pad 5 includes a generally vertical backing plate 21 having a rearwardly extending upper flange 22, and a rearwardly extending lower flange 23. A bracket 24 is secured to the upper end of plate 21, as shown in FIG. 4. The upper and lower ends of bracket 24 are provided with vertical flanges 25, which are secured to the central portion of plate 21 by a series of bolts 26 that are engaged with nuts 27 welded or otherwise secured to the front surface of plate 21. The center formed section of bracket 24 encloses the tubular upper section 9 of frame 6 and provides a journalling mechanism for permitting the head pad to pivot or rotate about the axis of section 9.

Head pad 5 also includes a cushion 28, formed of foam plastic material, which is mounted to the forward face of plate 21 and the cushion 28 is enclosed by a fabric or plastic covering 29. The upper and lower edges of the covering 29 extend around the flanges 22 and 23 and are secured to the flanges by beads 30.

Head pad 5 is biased or urged to the head supporting position by an extension spring 31. One end of spring 31 is connected to the lower portion of plate 21 of head pad 5, while the opposite end of the spring is connected to the upper edge of enclosure 16. A stop 32 is secured to one of the brackets 116 and is positioned to be engaged by flange 33 of plate 21 of the head pad 5 to maintain the head pad in the head supporting position.

When a fire fighter having a SCBA 19 strapped to his back is seated on the seat base 1, the cylinder 19 will be received within the cavity 15. When the fire fighter rises from seat base 1, the upper end of cylinder 19 will contact the lower end of head pad 5, thereby pivoting the head pad from the head supporting position to the release position, where the cylinder can then move upwardly without restraint from the head pad. In practice, the head pad is mounted for pivotal movement through an arc of at least 90°, and preferably about 120°, as shown by the full and dashed lines in FIG. 2.

Once the fire fighter with the SCBA strapped on his back is unseated, the force of spring 31 will return the head pad back to its original head supporting position.

The frame 6 serves a dual function in that it not only provides structural rigidity for the side pads 4, but the horizontal section 9 of frame 6 also serves as the pivot shaft for pivotal movement of head pad 5.

While the drawings illustrate the head pad being pivotable between the head supporting position and the release position, it is contemplated that the head pad can be mounted for other types of movement between the body supporting and release positions. While the invention has particular application for use as a seat in a fire truck to contain a SCBA cylinder, it is contemplated that the seat can also be used in other applications where it is desired to store a cylinder tank or other object within a cavity in a seat back.

FIGS. 5 and 6 illustrate a modified form of the invention relating to an improved mechanism for clamping the SCBA tank or cylinder to the seat. The seat includes a back closure 35, similar to closure 16 of the first embodiment. Closure 35 is generally U-shaped in horizontal cross section and includes a generally flat rear surface 36 with side surfaces 37 projecting forwardly from the side edges of rear surface 36. Each side surface 37 is provided with an outwardly extending flange 38 and the flanges are secured to the frames 6 and 7.

Cylinder 19 is retained within the closure 35 by a mechanism which includes a pair of upper brackets 39 and a pair of lower brackets 40. The brackets of each pair are spaced apart horizontally and the brackets are all of the identical construction which is best illustrated in FIG. 6.

Each bracket includes a generally flat supporting surface 41 which carries a resilient pad or cushion 42, preferably formed of a foam plastic material The surfaces 41 of each pair of brackets 39,40 lie in planes that diverge outwardly from rear surface 36.

One end of each bracket is provided with a bent lip 43 which is engaged with an elongated vertical slot 44 formed in rear surface 36. A series of vertically spaced slots 44 are provided for the upper brackets, while a single slot 44 is provided for each lower bracket. The upper series of slots 44 provides adjustment for the vertical position of upper brackets 39 to thereby accommodate tanks of different lengths.

The opposite end of each bracket 39,40 is provided with a bend 45 which terminates in flange 46. As shown in FIG. 6, flanges 46 are secured to side surfaces 37 by bolts 47.

The tank 19 is clamped to the supporting surfaces 41 of each pair of brackets 39,40 by a belt 48. As seen in FIG. 6, the belt 48 passes through a slot 49 in bend 45 and also extends through a slot 50 which is located adjacent lip 43. One of the free ends of belt 48, as shown in FIG. 5, is provided with a double loop 51 that defines a pair of openings 52 and 53, while the opposite free end of the belt is provided with a fastening mechanism which can take the form of hook and loop elements, such as sold under the Velcro and other trademarks. More specifically, one surface of the end of the belt 48 is provided with a hook section 54 and an adjacent loop section 55. The end of the belt is passed through the openings 52 and 53 in end 51, and the hook section 54 is then engaged with the loop section 55 to retain the belt in place.

While the drawings illustrate a pair of upper brackets 39 and a pair of lower brackets 40, it is contemplated that a single upper bracket and a single lower bracket can be utilized, each having a pair of supporting surfaces 41.

The mechanism. as shown in FIGS. 5 and 6 to store tank 19, has distinct advantages over the use of C-shaped metal clips as used in the past. As the supporting surfaces 41 are generally flat, the retaining mechanism can accommodate tanks of various diameters. In practice, tank diameters of 4.5 to 9 inches can be accommodated without any change in construction.

As the supporting surfaces 41 carry resilient pads 42, the tank is protected, thus reducing wear to the tank and vibrational noise.

As the belts 47 completely encompass the tank 19, there is no possibility of the tank being dislodged from the seat in the event the fire fighting truck should be impacted.

Various modes of carrying out the invention are contemplated as being within the scope of the following claims particularly pointing out and distinctly claiming the subject matter which is regarded as the invention.

We claim:

1. A seat construction having a provision to store a tank, comprising a back structure including a rear surface and a side surface extending forwardly from each side edge of the rear surface, tank support means including bracket means removably connected to said back structure, a pair of generally flat supporting surfaces disposed on said bracket means and located in forwardly diverging planes, said support surfaces being disposed to support a tank, and clamping means connected to said bracket means for clamping the tank to said supporting surfaces.

2. The seat construction of claim 1, and including a resilient pad mounted on each supporting surface and disposed to contact the tank.

3. The seat construction of claim 1, wherein said clamping means comprises a belt extending through openings in said bracket means, and fastening means for fastening the free ends of said belt together.

4. A seat construction having a provision to store a tank, comprising a back structure including a rear surface and a pair of side surfaces each extending forwardly from a side edge of said rear surface, a pair of brackets disposed in horizontally spaced relation, first connecting means for connecting one end of each bracket to said rear surface, second connecting means for connecting a second end of each bracket to one of said side surfaces, each bracket having a generally flat supporting surface with said supporting surfaces being disposed in forwardly diverging planes, said supporting surfaces disposed to support a tank, and strap means connected to said brackets for securing a tank to said supporting surfaces.

5. The seat construction of claim 4, wherein said first connecting means comprises a lip on each bracket and disposed at an angle to said supporting surface, said back surface having a slot to receive said lip.

6. The seat construction of claim 4, wherein said second connecting means comprises a fastener connecting said second end to the respective side surface.

7. The seat construction of claim 4, wherein each bracket is provided with a pair of spaced openings, said strap means comprising a belt extending through said openings in each bracket.

8. The seat construction of claim 7, wherein said belt has a pair of free ends and said construction includes fastening means for fastening said free ends together to clamp said tank against said supporting surfaces.

9. The seat construction of claim 4, and a resilient pad mounted on each supporting surface and disposed to engage said tank.

* * * * *